United States Patent
Doggett et al.

(10) Patent No.: US 11,080,835 B2
(45) Date of Patent: Aug. 3, 2021

(54) PIXEL ERROR DETECTION SYSTEM

(71) Applicant: Disney Enterprises, Inc., Burbank, CA (US)

(72) Inventors: Erika Doggett, Los Angeles, CA (US); Anna Wolak, Seattle, WA (US); Penelope Daphne Tsatsoulis, Dublin (IE); Nicholas McCarthy, Dublin (IE); Stephan Mandt, Santa Monica, CA (US)

(73) Assignee: Disney Enterprises, Inc., Burbank, CA (US)

( * ) Notice: Subject to any disclaimer, the term of this patent is extended or adjusted under 35 U.S.C. 154(b) by 109 days.

(21) Appl. No.: 16/243,650

(22) Filed: Jan. 9, 2019

(65) Prior Publication Data
US 2020/0219245 A1 Jul. 9, 2020

(51) Int. Cl.
*G06K 9/00* (2006.01)
*G06T 7/00* (2017.01)
*G06K 9/62* (2006.01)

(52) U.S. Cl.
CPC ........ *G06T 7/0002* (2013.01); *G06K 9/00718* (2013.01); *G06K 9/6202* (2013.01);
(Continued)

(58) Field of Classification Search
CPC . G06T 2207/10016; G06T 2207/20084; G06T 2207/20081; G06T 2207/10024;
(Continued)

(56) References Cited

U.S. PATENT DOCUMENTS 8,013,916 B2 9/2011 Rosen
8,077,774 B1 * 12/2011 Dawson ............... H04N 17/004
375/240.02

(Continued)

FOREIGN PATENT DOCUMENTS

WO 20108170393 9/2018

OTHER PUBLICATIONS

An, Jinwon, et al., "Variational Autoencoder based Anomaly Detection using Reconstruction Probability," SNU Data Mining Center, Dec. 27, 2015.

(Continued)

*Primary Examiner* — Guillermo M Rivera-Martinez
(74) *Attorney, Agent, or Firm* — Farjami & Farjami LLP (57) ABSTRACT

A process receives, with a processor, video content. Further, the process splices, with the processor, the video content into a plurality of video frames. In addition, the process splices, with the processor, at least one of the plurality of video frames into a plurality of image patches. Moreover, the process performs, with a neural network, an image reconstruction of at least one of the plurality of image patches to generate a reconstructed image patch. The process also compares, with the processor, the reconstructed image patch with the at least one of the plurality of image patches. Finally, the process determines, with the processor, a pixel error within the at least one of the plurality of image patches based on a discrepancy between the reconstructed image patch and the at least one of the plurality of image patches.

20 Claims, 10 Drawing Sheets

(52) U.S. Cl.
CPC .............. *G06T 2207/10016* (2013.01); *G06T 2207/10024* (2013.01); *G06T 2207/20021* (2013.01); *G06T 2207/20084* (2013.01); *G06T 2207/30168* (2013.01)

(58) Field of Classification Search
CPC ......... G06T 9/002; G06T 5/001; G06T 5/002; G06T 7/136; G06T 7/248; G06T 7/90; G06N 20/00; G06K 9/00758; G06K 9/40; G06K 2009/6213; G06K 9/4609; G06K 9/6201; G06K 9/621; G06Q 30/0244
See application file for complete search history.

(56) References Cited

U.S. PATENT DOCUMENTS

| | | | |
|---|---|---|---|
| 8,310,570 B1 | 11/2012 | Aldrich et al. | |
| 8,970,916 B2 | 3/2015 | Nakamura | |
| 9,685,056 B2 | 6/2017 | Klimer | |
| 10,083,378 B2 | 9/2018 | Chakraborty | |
| 2006/0177126 A1* | 8/2006 | Han | G06T 5/20 382/156 |
| 2008/0284854 A1 | 11/2008 | Thurston, III | |
| 2009/0103617 A1* | 4/2009 | Au | H04N 19/107 375/240.13 |
| 2009/0263044 A1* | 10/2009 | Imagawa | G06T 3/0087 382/275 |
| 2014/0133774 A1 | 5/2014 | Chen | |
| 2015/0029343 A1* | 1/2015 | Umeroglu | G11B 27/36 348/180 |
| 2016/0065959 A1 | 3/2016 | Stobaugh et al. | |
| 2016/0321523 A1 | 11/2016 | Sen et al. | |
| 2017/0337711 A1* | 11/2017 | Ratner | H04N 19/176 |
| 2017/0345130 A1* | 11/2017 | Wang | G06T 3/4053 |
| 2018/0150684 A1 | 5/2018 | Wang et al. | |
| 2018/0253624 A1 | 9/2018 | Schafer et al. | |
| 2018/0293496 A1* | 10/2018 | Vogels | G06K 9/623 |
| 2018/0293711 A1* | 10/2018 | Vogels | G06F 17/10 |
| 2019/0114818 A1* | 4/2019 | Lin | G06T 5/005 |
| 2019/0132591 A1* | 5/2019 | Zhang | H04N 19/59 |
| 2019/0171908 A1* | 6/2019 | Salavon | G06F 16/55 |
| 2019/0355155 A1* | 11/2019 | Shugrina | G06T 15/503 |
| 2019/0362518 A1* | 11/2019 | Croxford | G06T 7/194 |
| 2019/0373293 A1* | 12/2019 | Bortman | H04N 19/86 |
| 2020/0012940 A1* | 1/2020 | Liu | H04N 7/0127 |
| 2020/0045289 A1* | 2/2020 | Raziel | H04N 13/161 |
| 2020/0099954 A1* | 3/2020 | Hemmer | G06T 9/004 |
| 2020/0184224 A1* | 6/2020 | Taylor | G06K 9/00758 |

OTHER PUBLICATIONS

Hou, Xianxu, et al. "Deep Feature Consistent Variational Autoencoder," 2017 IEEE Winter Conference on Applications of Computer Vision, 2017.

* cited by examiner

PIXEL ERROR DETECTION SYSTEM

BACKGROUND

1. Field

This disclosure generally relates to the field of video production.

2. General Background

A video production pipeline may involve various stages, from start to finish, for producing video content (e.g., movies, television shows, video games, etc.). During video production, errors may be introduced into one or more of the video frames of the video content that diminish the quality of the final video content product. Such errors may result from image capture equipment not properly being maintained, image capture equipment malfunctions, or artifacts being inserted into the video during the rendering process. Using humans to perform error checking on a frame-by-frame basis is labor-intensive, often involving multiple workers reviewing the same content in the video production pipeline. Moreover, conventional computerized configurations have attempted to use computer vision technology (i.e., attempting to understand imagery in a manner similar to humans), but such attempts have typically led to either not catching enough errors or detecting too many false positives when performing error detection. Therefore, previous approaches do not efficiently and accurately detect errors in a video production pipeline.

SUMMARY

In one aspect, a computer program product comprises a non-transitory computer readable storage device having a computer readable program stored thereon. The computer readable program when executed on a computer causes the computer to receive, with a processor, video content. Further, the computer is caused to splice, with the processor, the video content into a plurality of video frames. In addition, the computer is caused to splice, with the processor, at least one of the plurality of video frames into a plurality of image patches.

Moreover, the computer is caused to perform, with a neural network, an image reconstruction of at least one of the plurality of image patches to generate a reconstructed image patch. The computer is also caused to compare, with the processor, the reconstructed image patch with the at least one of the plurality of image patches. Finally, the computer is caused to determine, with the processor, a pixel error within the at least one of the plurality of image patches based on a discrepancy between the reconstructed image patch and the at least one of the plurality of image patches.

In another aspect, an apparatus has a processor that performs the functionality of the aforementioned computer readable programs. In yet another aspect, a process performs such functionality.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

A pixel error detection system is provided to automatically recognize one or more pixel errors in video content during video production. An example of a pixel error is a dead pixel, which is a particular kind of pixel anomaly that results from a dead pixel on a camera and thus has the following specific characteristics: a) it lasts for the duration of the shot that the camera was used for; and b) it is a consistent color, usually black. Another example of a pixel error is a pixel hit, which is a temporary pixel anomaly that only appears for a single frame, or a small selection of frames, and does not persist for very long. As yet another example, a stuck pixel is a pixel that may be any color, but will persist over time. Another example is a hot pixel, which is usually white, or light colored, and results from a camera getting hot during long exposures. Another example is a firefly, which is a light, or colored, pixel that appears sporadically. A pixel error may be any color, and may result from various processes and sources.

Figure 1:
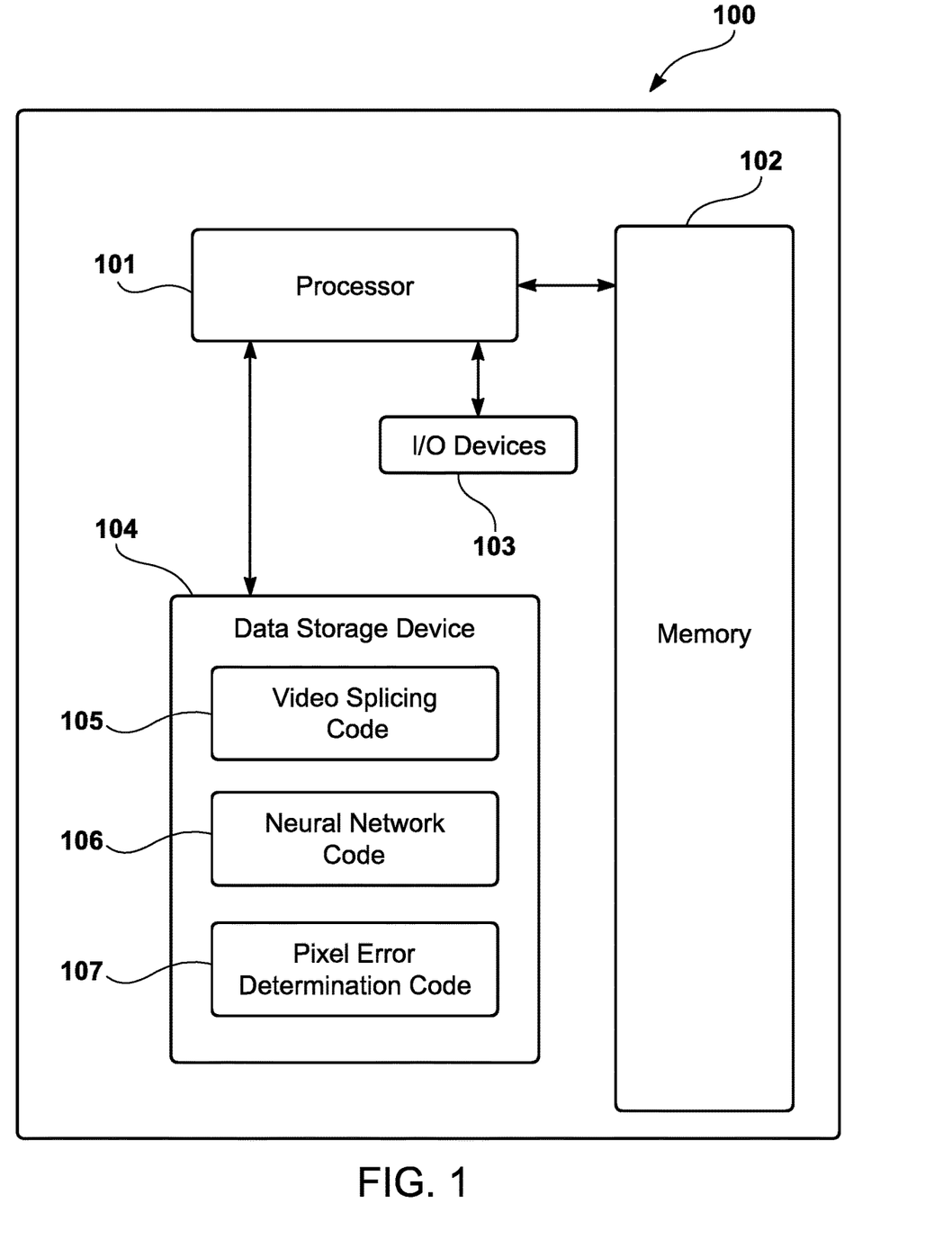
FIG. 1 illustrates a block diagram of the internal components of a pixel error detection system that is used to automatically detect pixel errors in video content.

FIG. 1 illustrates a block diagram of the internal components of a pixel error detection system 100 that may be used to automatically detect pixel errors in video content. The pixel error detection system 100 has a processor 101, a memory 102, an input/output ("I/O") device 103 (e.g., microphone, keyboard, mouse, pointing device, camera, display device, etc.), and a data storage device 104.

Further, the data storage device 104 stores thereon video splicing code 105, neural network code 106, and pixel error determination code 107. The processor 101 executes the video splicing code 105 to splice the video content into one or more frames, and further to splice each frame into component image patches. Further, the processor 101 executes the neural network code 106 to implement a neural network that generates reconstructed image patches based on the one or more image frames. Moreover, the processor 101 executes the pixel error detection code 107 to compare reconstructed image patches, generated by the neural network 106, with the original image patches of a video frame that were spliced by the processor 101 executing the video splicing code.

Figure 2:
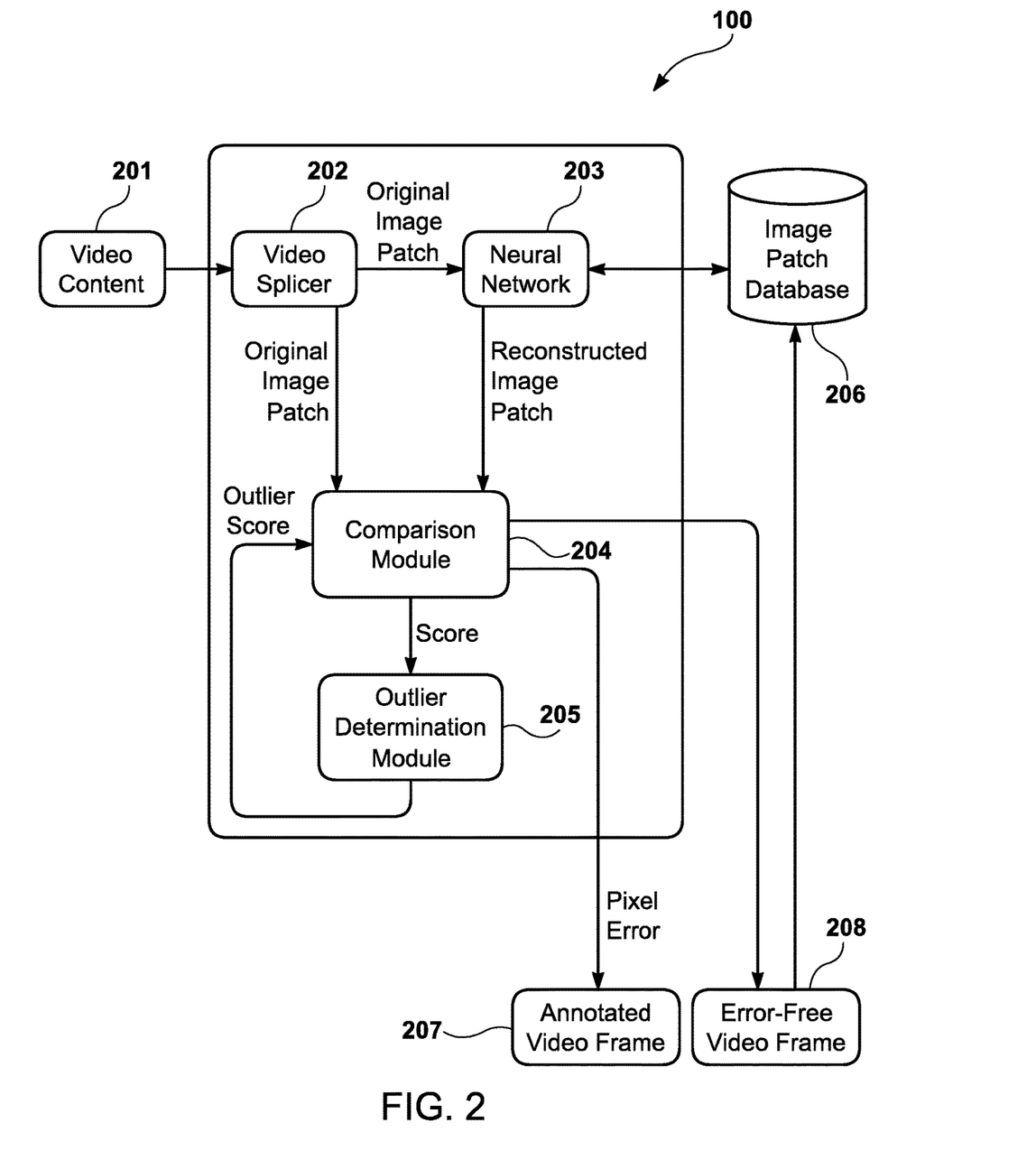
FIG. 2 illustrates a quality control ("QC") configuration that uses the pixel error detection system to detect pixel errors, such as dead pixels.

FIG. 2 illustrates a quality control ("QC") configuration 200 that may use the pixel error detection system 100 illustrated in FIG. 1 to detect pixel errors, such as dead pixels. The pixel error detection system 100 may be integrated within the QC configuration 200. Alternatively, the pixel error detection system 100 may be a stand-alone system that is in operable communication with the QC configuration 100.

The pixel error detection system 100 may receive video content 201 (e.g., via a local storage device, electronic transmission over a computerized network, etc.). Further, the pixel error detection system 100 may operate a video splicer 202 (i.e., via the processor 101 executing the video splicing code 105 illustrated in FIG. 1) to splice the video content 201 into individual video frames.

Figure 3:
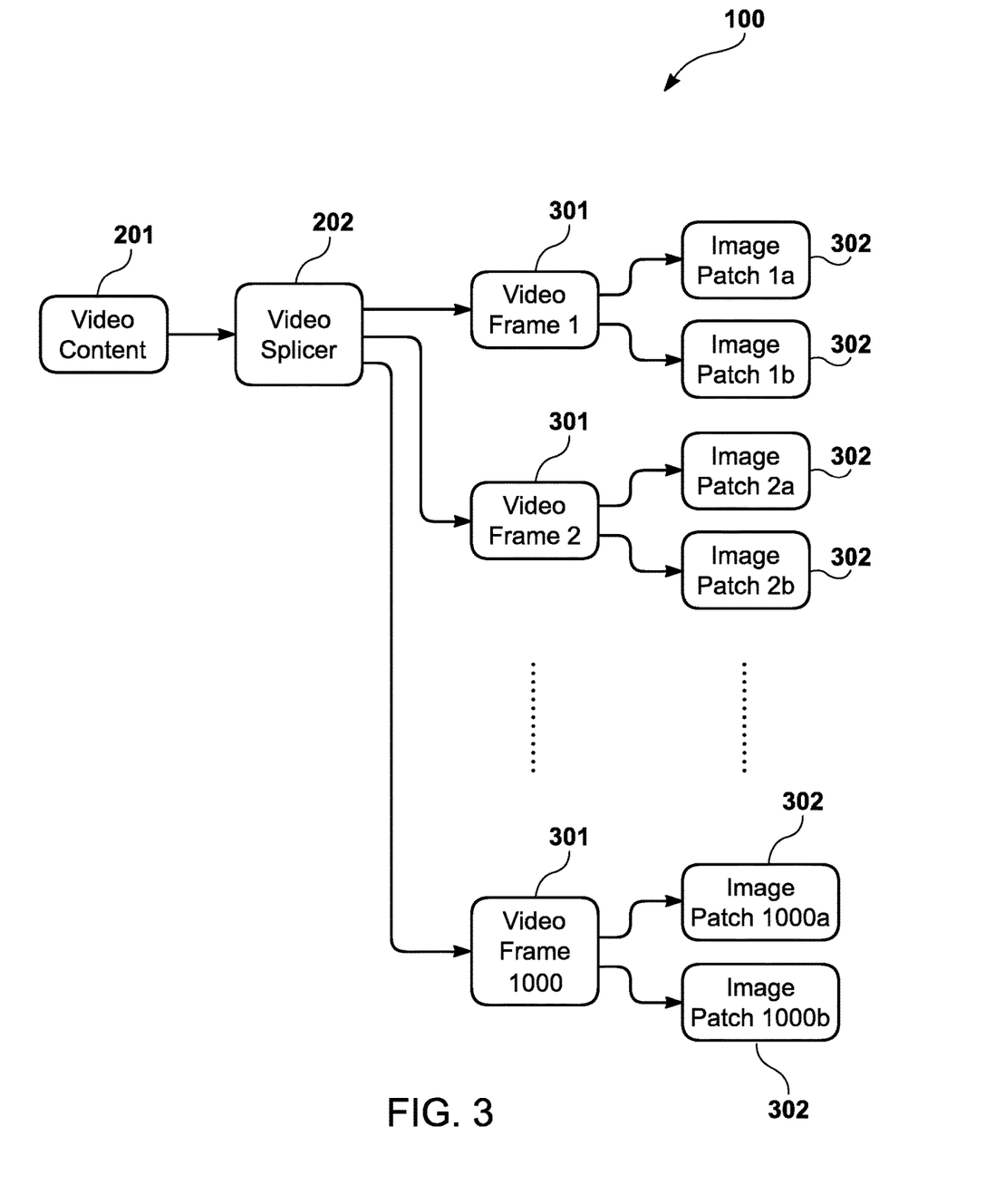
FIG. 3 illustrates an example of the video splicer splicing the video content in a plurality of video frames.

For instance, FIG. 3 illustrates an example of the video splicer 202 splicing the video content 201 in a plurality of video frames 301. Further, the video splicer 202 splices each video frame 301 into a plurality of image patches 302. (Two image patches 302 are illustrated per video frame 301 for ease of illustration, but more than two image patches 302 may result from the splicing.) In one aspect, a predetermined patch size is used for splicing a video frame into the plurality of image patches 302. For example, the patch size may have dimensions in the range of five-by-five to fifteen-by-fifteen pixels. Such patch dimensions allow for minimizing the possibility of false positives for pixel errors. For example, a larger patch size may result in a conclusion that an image patch 302 has more errors than are actually present (e.g., false positives) because the larger patch size provides more opportunities for error calculations to build up since the larger patch has more pixels. Nonetheless, the range of patch dimensions provided herein is provided only as an example since different patch sizes may be more optimal for different image processing techniques than others.

Turning again to FIG. 2, the video splicer 202 provides, for each spliced video frame 301 (FIG. 3), the plurality of image patches 302 to a neural network 203. As an example, the neural network 203 may be an autoencoder ("AE") neural network. The neural network 203 may be trained, from an image patch database 206, according to image patches that were previously determined to be error-free (e.g., non-dead pixel images). For example, the image patch database 206 may store image patches from previously edited video content that differs from the video content 201 being provided to the QC configuration 200 (e.g., a different movie). As another example, the image patch database 206 may store image patches from the same video content 201 that were previously determined to be error-free (e.g., image patches from a video frame at an earlier part of a movie than that currently being processed by the QC configuration 200).

When being provided with an original image patch 302 from the video splicer 202, the neural network 203 may produce a reconstructed image patch according to how the neural network 203 has been trained to generate images via the image patch database 206. For example, the neural network 203 may generate the reconstructed image patch via an encoding/decoding process performed on the original image patch 302. For instance, the neural network 203 may decompose an image patch 302 represented by a ten-by-ten-by-three matrix of pixel values (e.g., red, green, blue) into a vector (i.e., one-dimensional set of data). The neural network 203 may then provide the vector to an encoding network that encodes the vector into a smaller set of data according to a loss function that minimizes data loss. Finally, the neural network 203 may decode the smaller set of data back into a ten-by-ten-by-three matrix, which represents the reconstructed image patch. Other encoding/decoding processes, or different types of processes, may be used by the neural network 203 to perform the image reconstruction.

Further, if the original image patch 302 is error-free (e.g., no pixel errors, the neural network 203 should be able to generate the reconstructed image patch so that the reconstructed image patch has very small variations with the original image patch 302. Conversely, if the neural network 203 is only able to generate a reconstructed image patch that has large variations with the original image patches 302, the pixel error detection system 100 may determine that the original image patch 302 has one or more errors, such as dead pixels.

In other words, the neural network 203 attempts to reconstruct image patches based on the image patch database 206, which the neural network 203 knows has produced error-free image patches. If the same process that is used to generate error-free image patches also results in only small, or no, errors, the neural network 203 may conclude that the original image patch 203 did not have any pixel errors, or did not have any pixel errors that were significant enough to be noticeable by a viewer.

Accordingly, the pixel error detection system 100 may also use a comparison module 204 and an outlier determination module 205 to compare the original image patch 302 with the reconstructed image patch. In one aspect, the processor 101 illustrated in FIG. 1 may execute the pixel error determination code 107 to implement the comparison module 204 to perform such a comparison and establish an error score for a given original image patch 302 (FIG. 3). The error score may indicate the likelihood of the original image patch 302 having an error, such as a dead pixel. For instance, the error score may be associated with a size of a region in an image frame 301 corresponding to a pixel discrepancy (i.e., a larger discrepancy corresponds to a higher score). Various approaches such as Euclidean distance (i.e., measurements involving the ordinary straight-line distance between two points) may be used to calculate the error score.

Further, the processor 101 illustrated in FIG. 1 may execute the pixel error determination code 107 to implement the outlier determination module 205, which aggregates a distribution of error scores for a plurality, or possibly all, of the original image patches 302 for a given spliced video frame 301. The processor 101 may then use the outlier determination module 205 to determine which error scores are outliers from the remainder of the distribution of error scores. For example, a particular original image patch 302 may have a corresponding error score that is significantly higher (e.g., three standard deviations) than the average error score in the distribution. The processor 101 then selects such outliers as candidates for possible pixel errors.

Further, the processor 101 performs, via the comparison module 204 or another module, a comparison between the error score of a selected outlier image patch 302 of a particular spliced video frame 301 and the image patch that appears at the same, or substantially the same, coordinates of a previous frame. Accordingly, the processor 101 determines the difference in the error scores between an outlier image patch 302 and a previous image patch at the same, or substantially the same, coordinates of a previous video image frame 301 (e.g., the immediately preceding video image frame). If the difference in error scores exceeds a tolerance threshold, the processor 101 determines that a pixel error, such as a dead pixel, has occurred. The tolerance threshold may be predetermined prior to the determination of outliers, or may be automatically determined during the determination of such outliers.

In one aspect, the processor 101 may generate one or more visual annotations (e.g., boxes), which indicate pixel errors, and add such visual annotations to the affected video frame 301 to compose an annotated video frame 207. Accordingly, the pixel error detection system 100 may visually identify pixel errors for error correction. Alternatively, the processor 101 may generate a report that lists pixel errors, pixel error locations, and/or corresponding video frames 301. In another aspect, the processor 101 automatically performs pixel error correction (e.g., image processing to re-shade pixels to the color of surrounding pixels) with, or without, generating visual annotations and/or reports.

Additionally, the processor 101 may perform facial recognition on a video frame 301 to determine the location of a face in the video frame 301 to provide more possible candidates for pixel errors. If the pixel error detection system 100 determines that any discrepancy between the original image patch 302 and the reconstructed image patch occurs within the region of the face, the pixel error detection system 100 may bypass some, or all, of the error scoring processes described herein to determine that such discrepancy is a pixel error. In other words, pixel discrepancies (even if small) in an identified face is less tolerable than other parts of an image because a viewer may direct more attention to the face of a character in the video content 201 than other objects in a scene. Alternatively, the face region may be used to suppress candidates that do not appear in the face, and thus reduce the number of proposed pixels for evaluation.

Moreover, the processor 101 (FIG. 1) may use the comparison module 204 to provide error-free video frames 208 to the image patch database 206 for training of the neural network 203 for subsequent portions of the video content 201 or for different video content. Further, the error-free video frame 208 may be reviewed (e.g., via an automatic verification system, video producer, etc.) prior to being stored in the image patch database 206 to ensure that the error-free video frame 208 was, in actuality, error free. Accordingly, the neural network 203 may be re-trained to minimize false positives of error-free video frames 208.

Figure 4A:
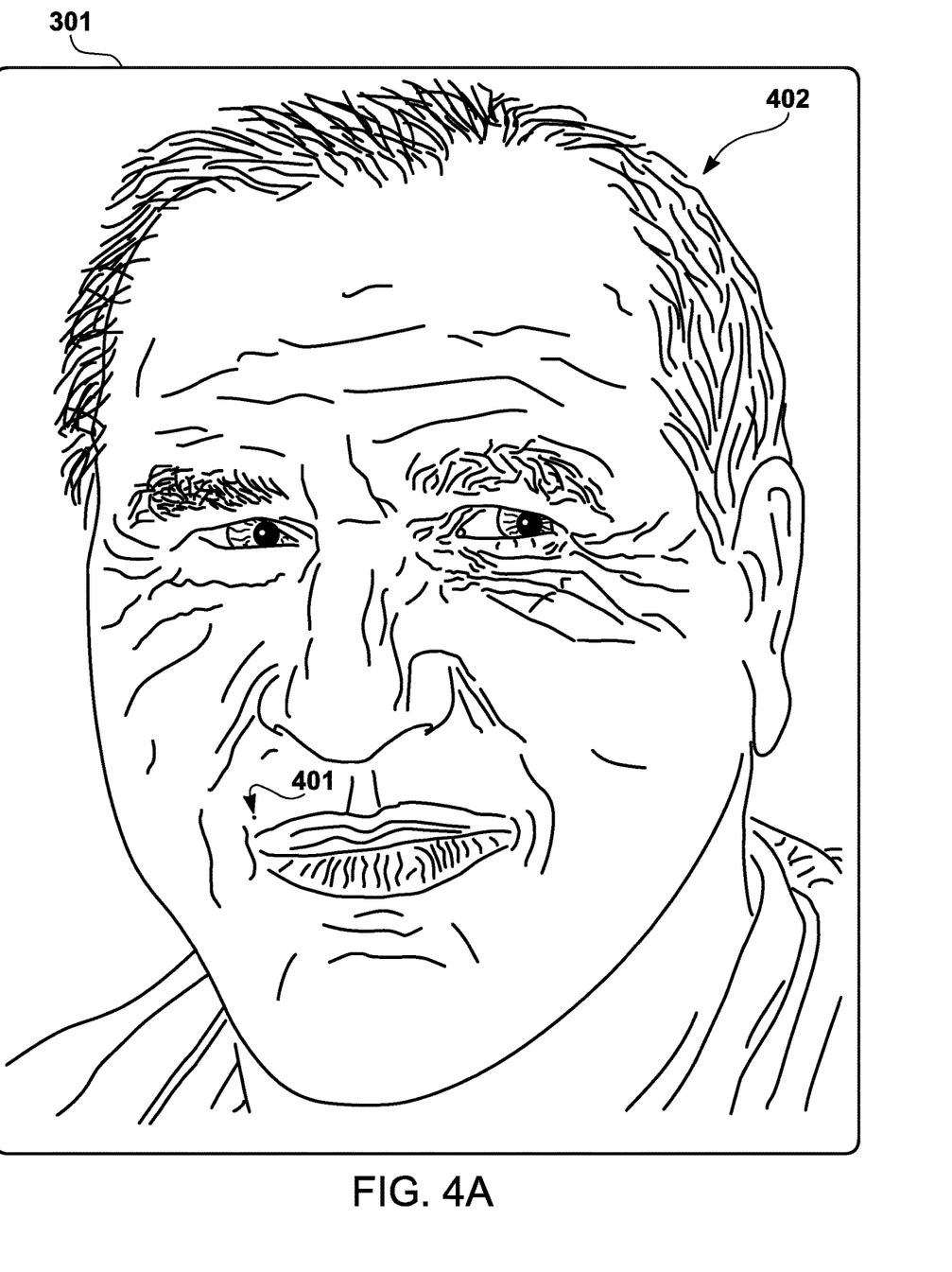
FIG. 4A illustrates an example of a video frame that has been spliced by the processor from the video content.

FIGS. 4A-8 illustrate examples of video frames 301 and image patches 302 that may be used by the pixel error detection system 100 illustrated in FIG. 1 to detect one or more pixel errors. In particular, FIG. 4A illustrates an example of a video frame 301 that has been spliced by the processor 100 from the video content 201 (FIG. 2). For instance, the video frame 301 may display an image of a character 402 in a movie. Further, a dead pixel 401 is displayed on the face of the character 402, but has not yet been detected by the pixel error detection system 100.

Figure 4B:
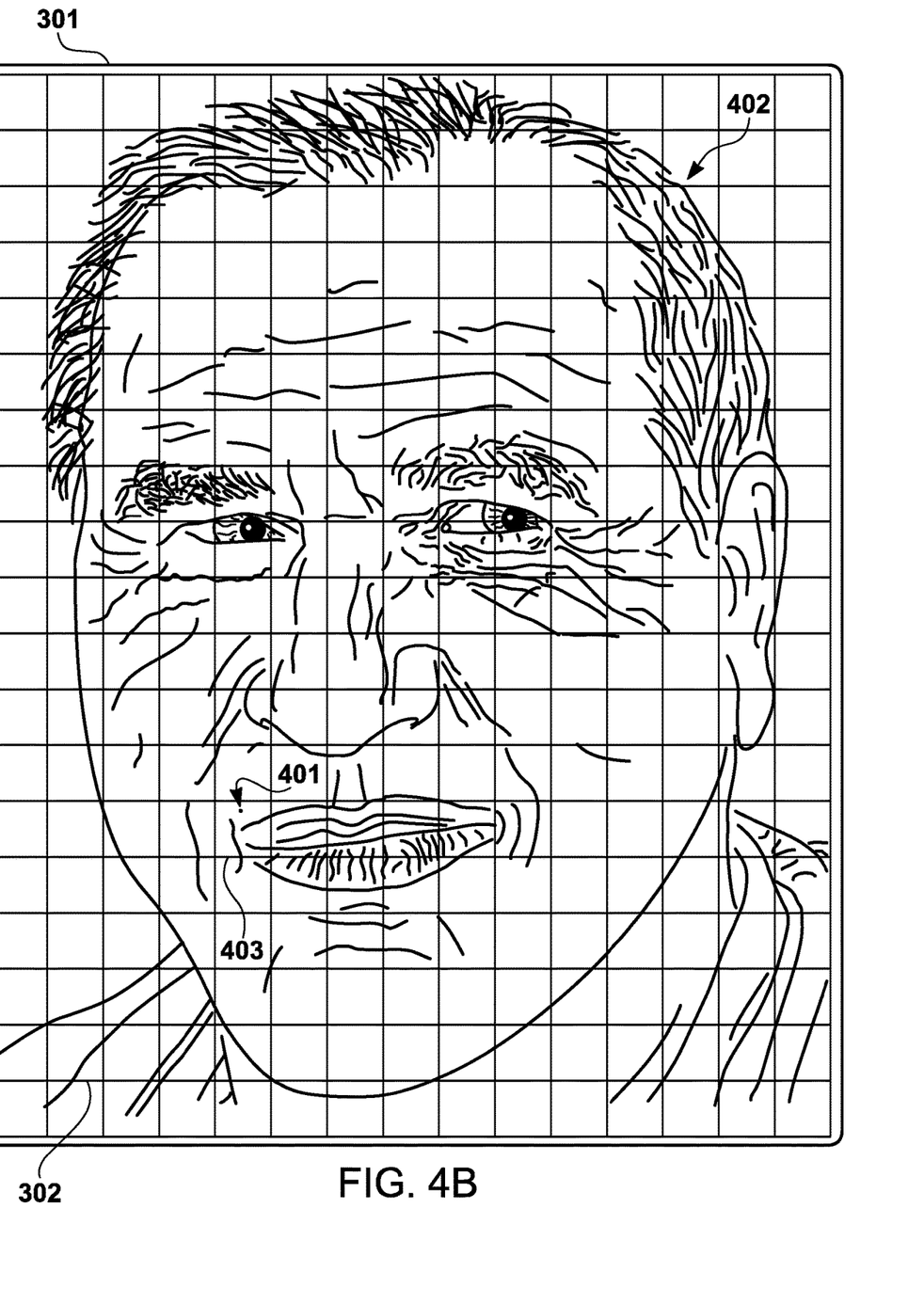
FIG. 4B illustrates a plurality of image patches that have been spliced from the video frame.

FIG. 4B illustrates a plurality of image patches 302 that have been spliced from the video frame 301. Accordingly, the dead pixel 401, which appears on the face of the character 402 is present within a particular image patch 403.

Figure 5:
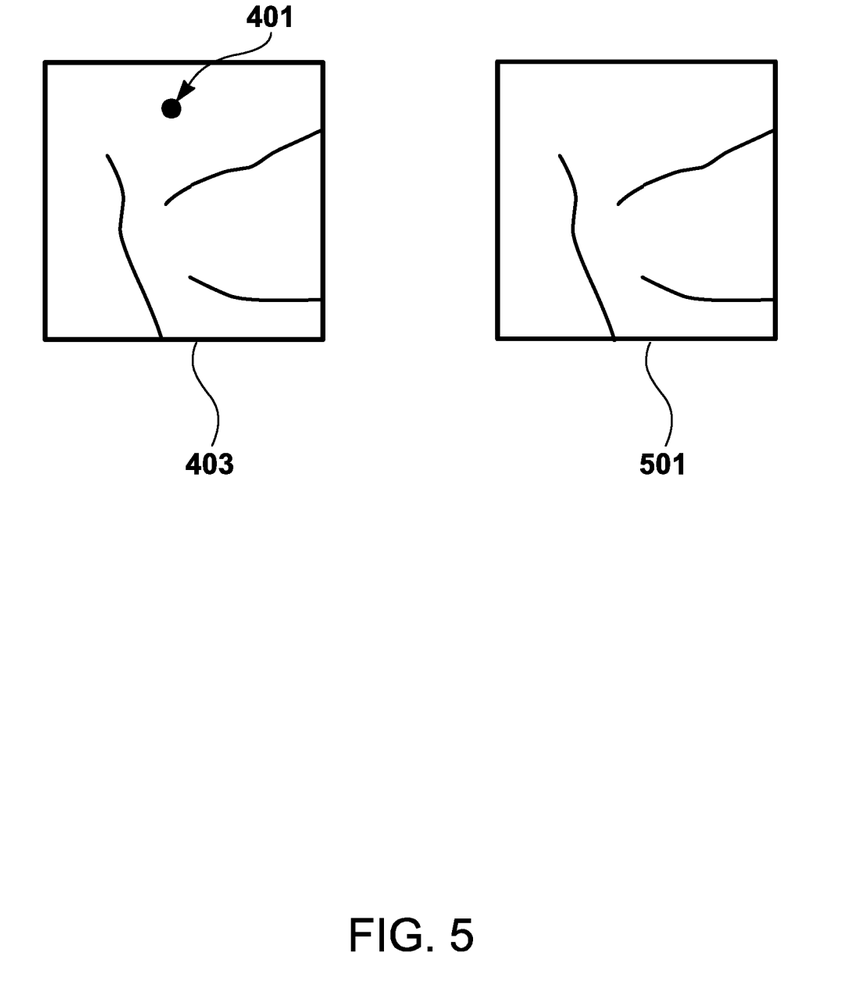
FIG. 5 illustrates the image patch illustrated in FIG. 4B and a reconstructed image patch, which was reconstructed by the neural network illustrated in FIG. 2.

Further, FIG. 5 illustrates the image patch 403 illustrated in FIG. 4B and a reconstructed image patch 501, which was reconstructed by the neural network 203 illustrated in FIG. 2. By comparing the two patches, the pixel error detection system 100 may determine a sizeable discrepancy in the form of the dead pixel 401, which appears in the image patch 403, but not in the reconstructed image patch 501.

Figure 6:
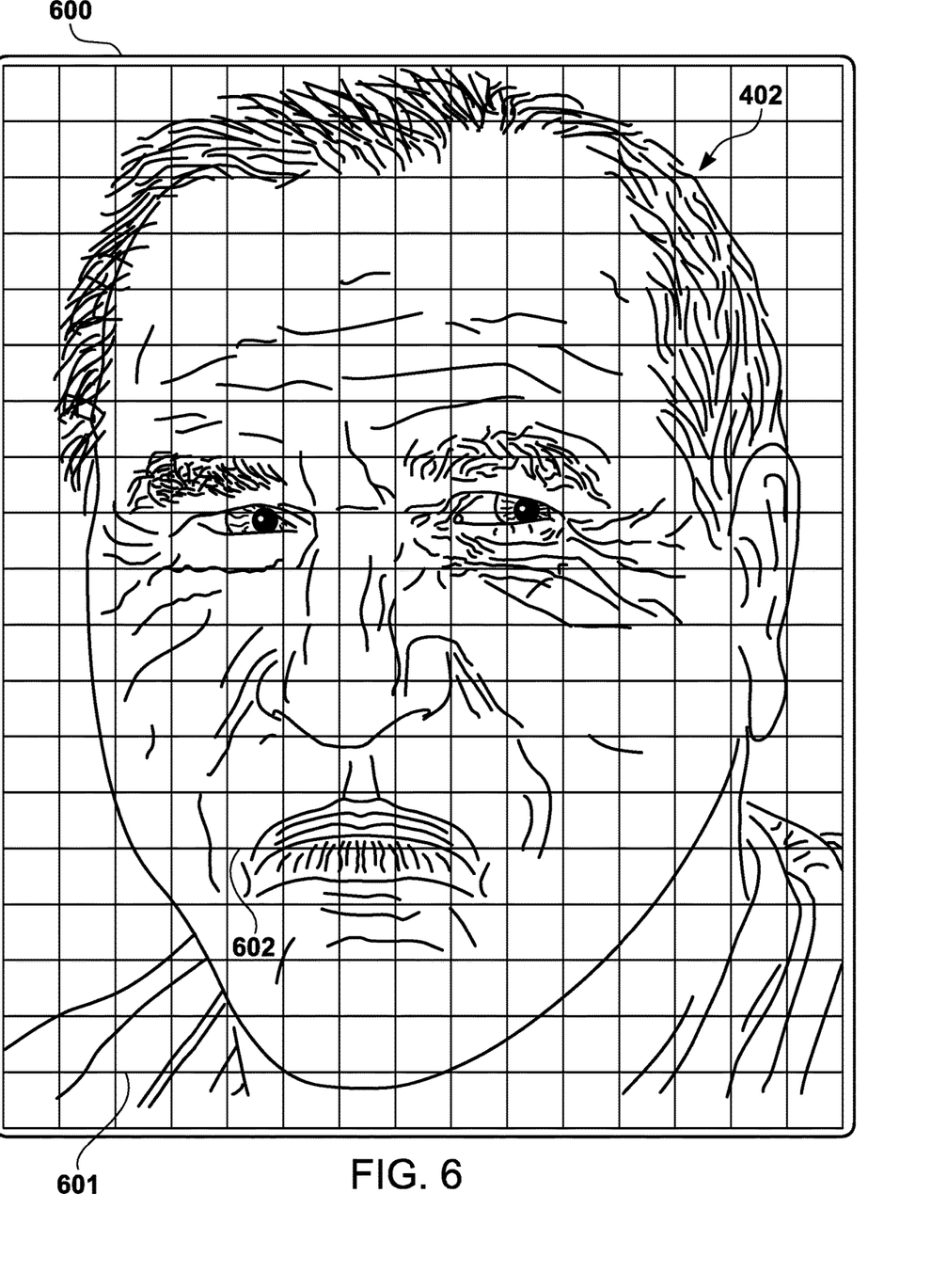
FIG. 6 illustrates the immediately preceding image frame retrieved by the pixel error detection system.

After determining that the discrepancy of FIG. 5 is an outlier, the pixel error detection system 100 illustrated in FIG. 1 may retrieve the immediately preceding image frame 600, as illustrated in FIG. 6. For example, the character 402 is displayed frowning in the preceding image frame 600, but smiling in the current image frame 301 illustrated in FIG. 4A. The pixel error detection system 100 may splice the preceding image frame 600 into a plurality of image patches 601.

Figure 7:
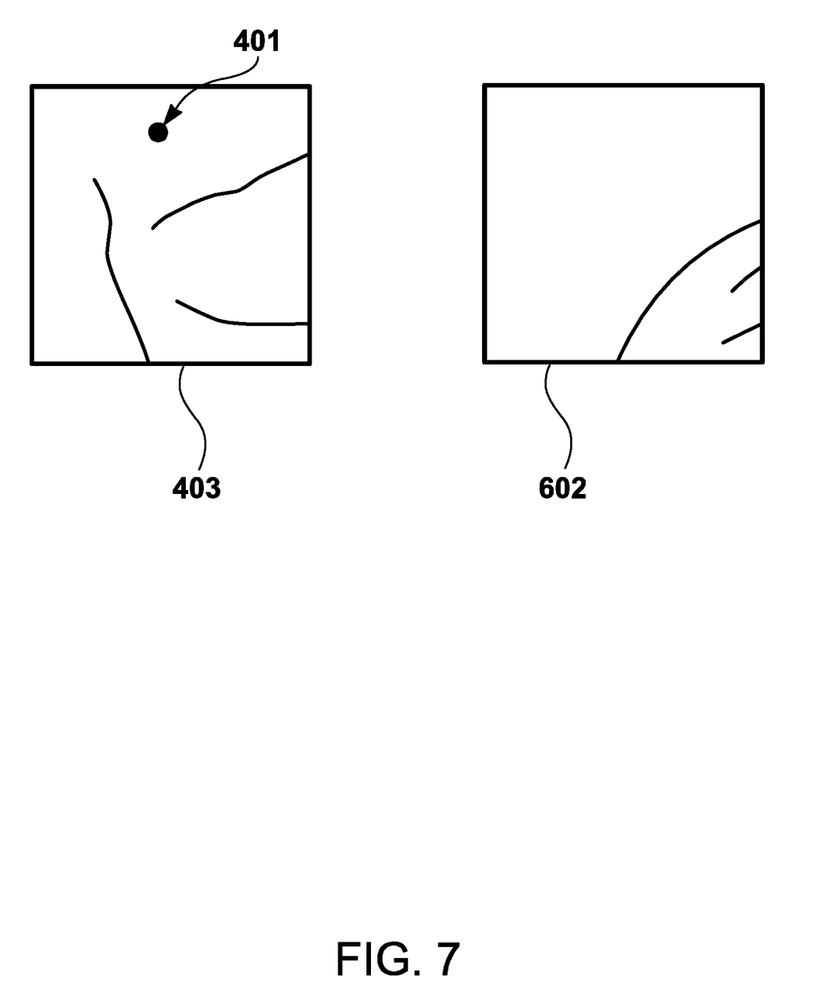
FIG. 7 illustrates an image patch, which has been identified by the pixel error detection system, that has the same coordinates as the image patch with the dead pixel.

Further, as illustrated in FIG. 7, the pixel error detection system 100 may identify an image patch 602 that has the same coordinates as the image patch 403 (FIG. 4B) with the dead pixel 401. If the pixel error detection system 100 determines a discrepancy between the image patch 602 and the image patch 403, the pixel error detection system 100 may conclude that the artifact illustrated on the face of the character is a pixel error, such as the dead pixel 401.

Conversely, if the pixel error detection system 100 determines that the same artifact is present in both image patches 403 and 602, the pixel error detection system 100 may conclude that the artifact is a natural artifact (e.g., a mole) that should be present. Alternatively, the pixel error detection system may perform testing on additional preceding and/or subsequent image frames to determine if other video image frames have the same artifact. For example, the dead pixel 401 may have occurred for a few frames, but is less likely to have occurred for a significant number of frames (e.g., twenty frames). If a smaller number of the image frames (e.g., two) have the dead pixel 401, but the remainder of a larger number of corresponding image patches 302 do not have the dead pixel 401, the pixel error detection system 100 may conclude that the artifact is a dead pixel 401; whereas if a larger number of frames have the artifact, the pixel error detection system 100 may conclude that the artifact is not a dead pixel. Accordingly, the pixel error detection system 100 may establish a maximum number of frames over which detection and consideration of pixel errors is not considered a pixel error. For instance, the pixel error detection system 100 may indicate a particular number of frames with respect to a particular scene change so that a frame-region persistence across a scene change indicates a possible pixel error, or that the lack of persistence within a scene specified by the maximum indicates a possible pixel error.

Figure 8:
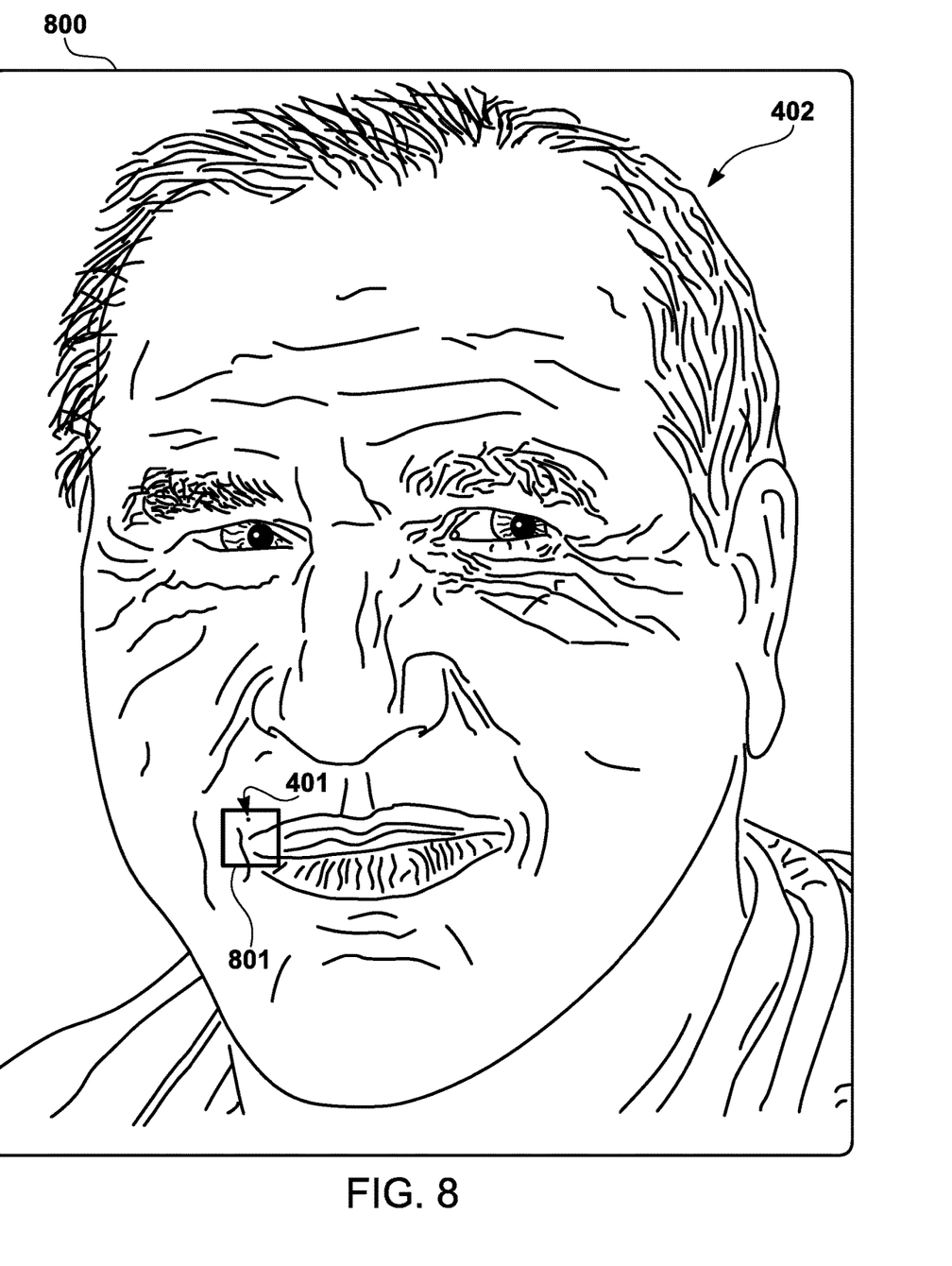
FIG. 8 illustrates an example of a visual marker that may be used to generate an annotated image frame of the character illustrated in FIG. 4A.

FIG. 8 illustrates an example of a visual marker 801 that may be used to generate an annotated image frame 800 of the character 402 illustrated in FIG. 4A. For example, if the pixel error detection system 100 (FIG. 1) identifies the dead pixel 401 as an error, the pixel error detection system 100 may draw a shape (e.g., square, rectangle, circle, oval, triangle, etc.) that surrounds the dead pixel 401.

Figure 9:
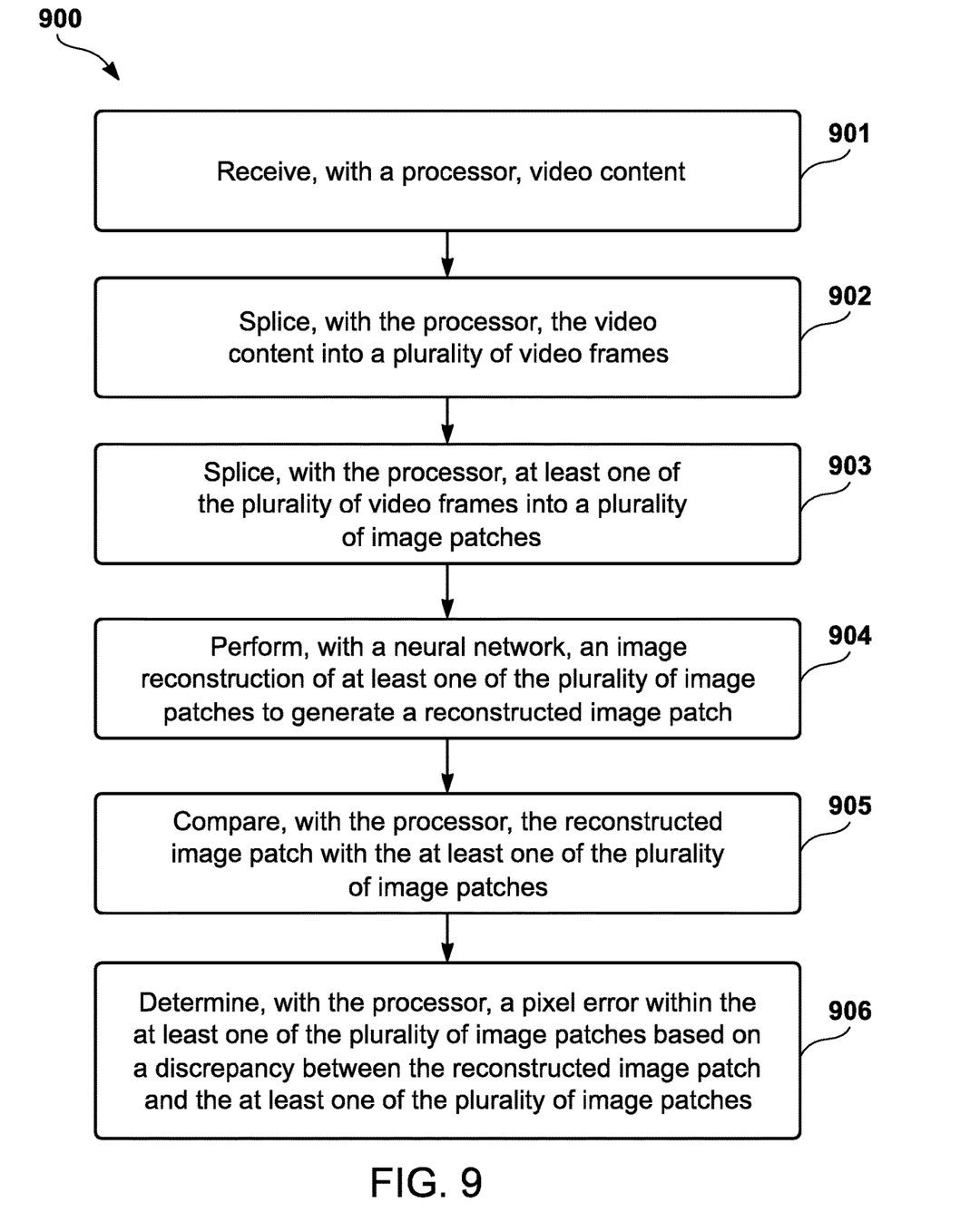
FIG. 9 illustrates a process that may be used by the pixel error detection system illustrated in FIG. 1 to detect one or more pixel errors.

FIG. 9 illustrates a process 900 that may be used by the pixel error detection system 100 illustrated in FIG. 1 to detect one or more pixel errors. At a process block 901, the process 900 receives, with the processor 101 (FIG. 1), video content 201 (FIG. 2). Further, at a process block 902, the process 900 splices, with the processor 101, the video content 201 into a plurality of video frames 301. Additionally, at a process block 903, the process 900 splices, with the processor 101, at least one of the plurality of video frames 301 into a plurality of image patches 302.

At a process block 904, the process 900 performs, with the neural network 203 (FIG. 2), an image reconstruction of at least one of the plurality of image patches 302 (FIG. 3) to generate a reconstructed image patch. Further, at a process block 905, the process 900 compares, with the processor 101 (FIG. 1), the reconstructed image patch with the at least one of the plurality of image patches 302. Finally, at a process block 906, the process 900 determines, with the processor 101, a pixel error within the at least one of the plurality of image patches 302 based on a discrepancy between the reconstructed image patch and the at least one of the plurality of image patches 302.

The neural network 203 illustrated in FIG. 2 is not limited to being trained on one particular type of video content stored in the image patch database 206. For example, the neural network 203 may be trained on combined live action and animation, an optimal copy of original content, fast-paced live action content, slow-panning content, only hand-drawn two-dimensional ("2D") content, and/or modern three-dimensional ("3D") animation content. For example, in the case of the optimal copy (i.e., pixel error-free) of original content, the neural network 203 may be initially trained on the optimal copy, and subsequent versions of the same content would be checked by that specifically trained neural network 203 against the optimal copy.

Further, other variations may be used to train and implement the neural network 203 (FIG. 2) and associated componentry. For example, in one aspect, the pixel error detection system 100 (FIG. 1) may use the neural network 203 to reconstruct image patches for the pixel error detection system 100 to use as a baseline for comparison without outlier and/or previous frame analysis.

In another aspect, the pixel error detection system 100 may use a regional approach that uses high pass filtering and interquartile range ("IQR") outlier recognition, followed by a one or more binary classification convolutional neural networks ("CNN") to classify pixels in the suggested regions as anomalous or non-anomalous. For example, high pass filtering may be used, rather than AE reconstruction, to produce a modified image patch. The modified image patch may then be compared to the original image patch to generate an error score for any discrepancy (e.g., via Euclidian distance), just as with the approach described with respect to FIG. 2. Further, the IQR outlier recognition reduces the number of pixel error candidates. Moreover, the binary classification CNN may use temporal vector data by encoding temporality and achieving a comparison between two frames internal to the CNN. Further, the binary classification CNN may perform a comparison with a previous patch to check a particular facial region.

In one aspect, a feedback loop is provided for confirmed errors in one or more patches with or without a neural network (i.e., a different neural network than the neural network 203 illustrated in FIG. 2). For example, image reconstruction may be performed via a neural network (e.g., AE), whereas patch comparison and decision-making on whether or not a pixel error is present is performed by the remainder of the pixel error detection system 100 illustrated in FIG. 1. As another example, the image construction is performed by a high pass filter, and subsequent comparisons and decision-making on whether or not a pixel error is present is performed by the neural network. Further, one or more CNNs may be used in place of the comparison module 204 and/or the outlier detection module 205 illustrated in FIG. 2.

In contrast with previous configurations, the pixel error detection system 100 (FIG. 1) described herein improves the functioning of a computer (e.g., processor 101) by improving the accuracy at which pixel errors are detected. In contrast with previous configurations (e.g., computer vision approaches) that caught too few errors or generated too many false positives, the pixel error detection system 100 has improved accuracy. Further, the pixel error detection system 100 may be performed with parallel computer processing to improve processing speed of pixel error detection. For example, a first processor may detect pixel errors on a first spliced video frame 301 (FIG. 3), whereas a second processor may detect pixel errors on a second spliced video frame 301.

The image processing described herein may be performed before, interleaved with, or performed after the learning/training by the neural network 203 illustrated in FIG. 2.

The processes described herein may be implemented in a specialized processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool.

A computer readable medium may be any medium, e.g., computer readable storage device, capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a specialized, general, multi-purpose, or single purpose processor as described above. For example, a computer may be a desktop computer, laptop, smartphone, tablet device, set top box, etc.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a non-transitory computer readable storage device having a computer readable program stored thereon, wherein the computer readable program when executed on a computer causes the computer to:

receive, with a processor, video content;

splice, with the processor, the video content into a plurality of video frames;

splice, with the processor, at least one of the plurality of video frames into a plurality of image patches;

perform, with a neural network, an image reconstruction of at least one of the plurality of image patches to generate a reconstructed image patch;

compare, with the processor, the reconstructed image patch with the at least one of the plurality of image patches;

generate, with the processor, an error score based on a discrepancy between the reconstructed image patch and the at least one of the plurality of image patches;

determine, with the processor, whether the error score is an outlier based on a comparison of the error score with a plurality of error scores corresponding to a distribution of error scores for the plurality of image patches; and determine, with the processor, whether a pixel error is present within the at least one of the plurality of image patches when the error score is determined to be the outlier.

2. The computer program product of claim 1, wherein the computer is further caused to compare the error score with an error score corresponding to an image patch of a previous video frame, the image patch of the previous video frame having substantially similar coordinates as the at least one of the plurality of image patches.

3. The computer program product of claim 1, wherein the computer is further caused to classify the at least one of the plurality of image patches as having a pixel error when a difference between the error score and an error score corresponding to the image patch of a previous video frame exceeds a first tolerance threshold.

4. The computer program product of claim 3, wherein the computer is further caused to annotate the at least one of the plurality of video frames with a visual marker indicating a location of the pixel error.

5. The computer program product of claim 2, wherein the computer is further caused to automatically correct the pixel error based upon the classification of the at least one of the plurality of image patches as having the pixel error.

6. The computer program product of claim 1, wherein the pixel error is a pixel discoloration with respect to the at least one of the plurality of image patches.

7. The computer program product of claim 1, wherein the computer is further caused to train the neural network based on an image database that stores one or more error-free image patches.

8. The computer program product of claim 1, wherein the video content is selected from the group consisting of: a movie, a television show, a video game, and an animation.

9. A method comprising:
receiving, with a processor, video content;
splicing, with the processor, the video content into a plurality of video frames;
splicing, with the processor, at least one of the plurality of video frames into a plurality of image patches;
performing, with a neural network, an image reconstruction of at least one of the plurality of image patches to generate a reconstructed image patch;
comparing, with the processor, the reconstructed image patch with the at least one of the plurality of image patches;
generating, with the processor, an error score based on a discrepancy between the reconstructed image patch and the at least one of the plurality of image patches;
determining, with the processor, whether the error score is an outlier based on a comparison of the error score with a plurality of error scores corresponding to a distribution of error scores for the plurality of image patches; and
determining, with the processor, whether a pixel error is present within the at least one of the plurality of image patches when the error score is determined to be the outlier.

10. The method of claim 9, further comprising comparing the error score with an error score corresponding to an image patch of a previous video frame, the image patch of the previous video frame having substantially similar coordinates as the at least one of the plurality of image patches.

11. The method of claim 9, further comprising classifying the at least one of the plurality of image patches as having a pixel error when a difference between the error score and an error score corresponding to the image patch of a previous video frame exceeds a first tolerance threshold.

12. The method of claim 11, further comprising annotating the at least one of the plurality of video frames with a visual marker indicating a location of the pixel error.

13. The method of claim 10, further comprising automatically correcting the pixel error based upon the classification of the at least one of the plurality of image patches as having the pixel error.

14. The method of claim 9, wherein the pixel error is a pixel discoloration with respect to the at least one of the plurality of image patches.

15. The method of claim 9, further comprising training the neural network based on an image database that stores one or more error-free image patches.

16. An apparatus comprising:
a processor that receives video content, splices the video content into a plurality of video frames, splices at least one of the plurality of video frames into a plurality of image patches, compares a reconstructed image patch with the at least one of the plurality of image patches, generates an error score based on a discrepancy between the reconstructed image patch and the at least one of the plurality of image patches, determines whether the error score is an outlier based on a comparison of the error score with a plurality of error scores corresponding to a distribution of error scores for the plurality of image patches, and determines whether a pixel error is present within the at least one of the plurality of image patches when the error score is determined to be the outlier; and
a neural network that performs an image reconstruction of the at least one of the plurality of image patches to generate the reconstructed image patch.

17. The computer program product of claim 3, wherein the first tolerance threshold is smaller when the at least one of the plurality of image patches is part of the face than when the at least one of the plurality of image patches is not part of the face.

18. The method of claim 11, wherein the first tolerance threshold is smaller when the at least one of the plurality of image patches is part of the face than when the at least one of the plurality of image patches is not part of the face.

19. The apparatus of claim 16, wherein the processor further classifies the at least one of the plurality of image patches as having a pixel error when a difference between the error score and an error score corresponding to the image patch of a previous video frame exceeds a first tolerance threshold.

20. The apparatus of claim 19, wherein the first tolerance threshold is smaller when the at least one of the plurality of image patches is part of the face than when the at least one of the plurality of image patches is not part of the face.

* * * * *